UNITED STATES PATENT OFFICE.

RAMON QUIJANO, OF SAN ANTONIO, TEXAS.

METHOD OF LIBERATING THE FIBERS OF THE AGAVE AND SIMILAR FLESHY PLANTS.

1,368,750. Specification of Letters Patent. Patented Feb. 15, 1921.

No Drawing. Application filed August 4, 1919. Serial No. 315,244.

*To all whom it may concern:*

Be it known that I, RAMON QUIJANO, a citizen of the Republic of Mexico, residing at San Antonio, in the county of Bexar and State of Texas, have invented certain new and useful Improvements in Methods of Liberating the Fibers of the Agave and Similar Fleshy Plants, of which the following is a specification.

The invention relates to the recovery of commercial fibers from certain varieties of fleshy plants, more especially the wild plants such as grow in Mexico, including the agave, lechuguilla, tula, jaumave, sisal, aloe and pita; henequen, tequila, sotol and maguey; guapilla or huapilla; palma, palma-pita, palmilla and palmetto.

The fibrous nature of many of these plants has been long known and many attempts have been made to recover the fibers from them for commercial purposes. Although some experimenters have endeavored to separate the fibers from the resinous and pulpy content by chemical methods, the universal practice, so far as I am aware, is still the slow, tedious, inefficient and wasteful hand-scraping method.

I have found that by certain treatment, the fibers of these fleshy plants can be completely separated from the binding gums, pulp, etc., and recovered as a high-grade light-colored strong and lustrous fiber, suitable for manufacture of high-grade textiles.

According to my process, the plants, either the whole of the cut plants or the center bunches of fleshy leaves, are assorted according to size of leaf. The leaves are passed through a cane-brake or other suitable crushing device to thoroughly break open the stalks and express the juices. The crushed leaves are then soaked for from three to five days, depending upon the size and age of the leaves, in a bath capable of removing the easily-soluble gums and resins. This bath, which may be warm but not too hot and never at a boiling temperature, may comprise some well known solvent such as benzin, gasolene, etc., but I prefer a fermentive bath. There are various materials which are suitable, including cane-sugar syrup, vinegar and yeast, or even sea-water. The bath chosen will depend largely upon the particular species of plant used, the size or age of the leaves, the character of the gums, etc. Where a fermentive bath is employed, I have found it highly advisable to use in such bath the juices expressed in the crushing operation. By so using these juices, I have found that many hours may be saved in the soaking-step. After soaking as described until the easily-soluble gums from the bulk of the leaves have been loosened or extracted, the leaves are removed and assorted to cull out any which have not been sufficiently soaked. The latter are returned for re-soaking. The remainder of the leaves, that is, those from which the more soluble gums and resins have been extracted are thoroughly washed with water to free them of the extracted gums, the salts formed, etc., and in case an acid or fermentive bath has been employed, a neutralizing agent such as lime is added.

The washed leaves are next boiled with a suitable digestive agent, which may be acid, alkaline or saline, which at the temperature employed dissolves the remaining difficultly-soluble gums. The particular reagent employed and the proportion depend upon the size or age of the leaves, the species of plant being treated and therefore the character of the gums, just as is the case in the soaking-bath. In this boiling-bath the leaves are cooked until the fibers are released from substantially all of the gums and resinous materials of the plant, and can be easily separated out mechanically.

The de-gummed fibers are then separated from the loosened and dissolved gums and from the pulp by any suitable mechanical means known to the art, such as by straining, and are then washed. After this washing they may be re-strained if necessary.

In case the fibers are to be used for ropes, brushes of certain varieties, and other purposes which do not require white fibers, the fibers strained as above described may be dried directly and marketed.

Where very light-colored or white fibers are required, the strained fibers are subjected to a bleaching-bath, which may be a boiling dilute solution of sulfuric acid or a current of chlorin or any other well known bleaching-bath. Certain varieties of the plants enumerated, those of the palma family, have fibers which are so white at the completion of the digestion treatment that no bleaching is necessary. The fibers of the

UNITED STATES PATENT OFFICE.

AUGUSTE C. E. RATEAU, OF PARIS, FRANCE.

MEANS FOR COOLING TURBINE-ROTORS.

1,368,751.  Specification of Letters Patent.  Patented Feb. 15, 1921.

Application filed November 29, 1918. Serial No. 264,756.

*To all whom it may concern:*

Be it known that I, AUGUSTE C. E. RATEAU, a citizen of the French Republic, residing at Paris, France, have invented certain new and useful Improvements in Means for Cooling Turbine-Rotors, of which the following is a specification.

This invention relates to turbines driven by gas at very high temperature, and consists in the provision of means for cooling the rotors or wheels with a view to restricting the heating of the rotor and, consequently, of obviating a considerable diminution of its resistance. The invention is characterized by the employment of vanes carried around by the rotor of the turbine and delivering a current of cool air around the hub of the latter on one or both sides of the rotor.

The accompanying drawing illustrates, by way of example, methods of carrying out the invention, Figure 1 being a section through a hot-gas turbine, provided with vanes arranged at intervals on the turbine wheel itself, while Fig. 2 shows a turbine coupled to a fan which effects the cooling of the turbine wheel.

In Fig. 1 *c* are vanes constituting a fan, mounted at intervals on the lateral faces of the rotor *a*. These vanes may be made in one piece with the rotor. *d* is a space around the shaft for enabling the atmospheric air to gain access to the fan and come in contact with the rotor of the turbine.

A few vanes *c* (say four or five) are sufficient. They are restricted to a radius so calculated that the pressure produced by the auxiliary fan which they constitute is greater than the pressure of the hot gases around the rim of the turbine rotor.

According to Fig. 2, the turbine *a* drives a fan, blower or compressor *e* in the ordinary way. The cooling of the turbine may then be effected by the fan itself, that is to say the vanes of the latter take the place of the vanes *c* in Fig. 1. One portion of the air or other gas issuing from the fan is discharged for example through orifices *g* in the fan casing and directed against the hub *b* of the turbine, preferably through two conduits *f*, *f¹* arranged right and left of said hub. These passages may be formed in the arms supporting the end bearings. The gases discharged by the fan come into contact with the rotor before escaping at its periphery. Moreover, the centrifugal force of the turbine assists in the circulation of the gases.

The orifices *g* are arranged at such a distance from the axis that the pressure is sufficient to overcome the gas pressure prevailing around the turbine rotor, but nevertheless reduced to a minimum so as not to increase unnecessarily the power absorbed by the fan.

The invention is applicable to all kinds of turbines employing air or gases at high temperature, such as the turbines driven by the exhaust gases from an internal-combustion engine.

Having now particularly described and ascertained the nature of my said invention and in what manner the same is to be performed, I declare that what I claim is:

1. In combination, a turbine wheel, a housing adjacent to and surrounding said wheel and means for drawing a current of cold air into said housing and directing it against the hub of the turbine wheel.

2. Means for cooling the rotors of hot gas turbines, comprising a centrifugal fan operated by the turbine rotor, a casing surrounding said fan having intake and discharge openings for the cooling medium, and ducts connected with said discharge openings and adapted to direct the cooling medium against the rotor hub.

3. Means for cooling the rotors of hot gas turbines, comprising a rotor casing and a turbine rotor journaled therein, a centrifugal fan disposed in a separate portion of said casing and directly operated by said rotor, said fan casing portion having intake and discharge openings for the cooling medium, ducts connected with said discharge openings and adapted to direct the cooling medium against the rotor hub, said ducts being formed in the turbine casing portion supporting the rotor bearings.

4. In combination, a turbine, annular guides fixed relatively to the turbine on opposite sides thereof, and shaped to follow the surface of the turbine, each being spaced therefrom to define a passage for a cooling medium.

5. In combination, a turbine, an annular guide fixed relatively to the turbine and shaped to follow the surface of the turbine substantially from the hub of the turbine to the buckets of the turbine to define a passage for a cooling medium.

AUGUSTE C. E. RATEAU.